United States Patent [19]

Boyer

[11] 4,033,597
[45] July 5, 1977

[54] APPARATUS FOR CARRYING GLASS PANELS

[76] Inventor: Ambroise O. Boyer, 2345 Randolph, Windsor, Ontario, Canada

[22] Filed: Dec. 22, 1975

[21] Appl. No.: 642,905

[52] U.S. Cl. ................................ 280/46; 211/41; 280/79.1
[51] Int. Cl.² .......................................... B62B 1/08
[58] Field of Search ........... 280/46, 79.1 A, 79.1 R; 211/41

[56] References Cited

UNITED STATES PATENTS

| | | | |
|---|---|---|---|
| 1,728,839 | 9/1929 | Staley | 280/46 |
| 2,687,310 | 8/1954 | Geotz | 280/46 |
| 2,946,453 | 7/1960 | Pityo | 211/41 |
| 3,514,001 | 5/1970 | DeMeritt | 280/79.1 R |

*Primary Examiner*—Robert R. Song
*Attorney, Agent, or Firm*—Cullen, Settle, Sloman & Cantor

[57] ABSTRACT

A windshield carrier for supporting and transporting glass panels such as curved windshields for automobiles and the like. The two elongated sides of a body frame are covered with a medium hard rubber base and each side includes a spaced row of upright dowels. Each dowel has a sponge rubber sleeve and a medium hard rubber cap. The spacing between adjacent dowels is sufficient to supportively receive a windshield having the greatest curvature expected to be encountered. At least a portion of the lower edge of the windshield rests on the base and a portion of its side rests against one of the sleeves to prevent breaking, scratching and slipping of the windshield. A sponge rubber pad may be inserted between the opposite side of the supported windshield and the adjacent dowel to further secure and protect the windshield. The body frame includes openings on at least one side for receiving the tines of a fork lift for positioning the carrier in a first direction and similar apparatus or, in the alternative, wheels at the ends thereof for positioning in a transverse direction so that the carrier can be positioned for loading and unloading from either the sides or the ends of the carrier.

7 Claims, 4 Drawing Figures

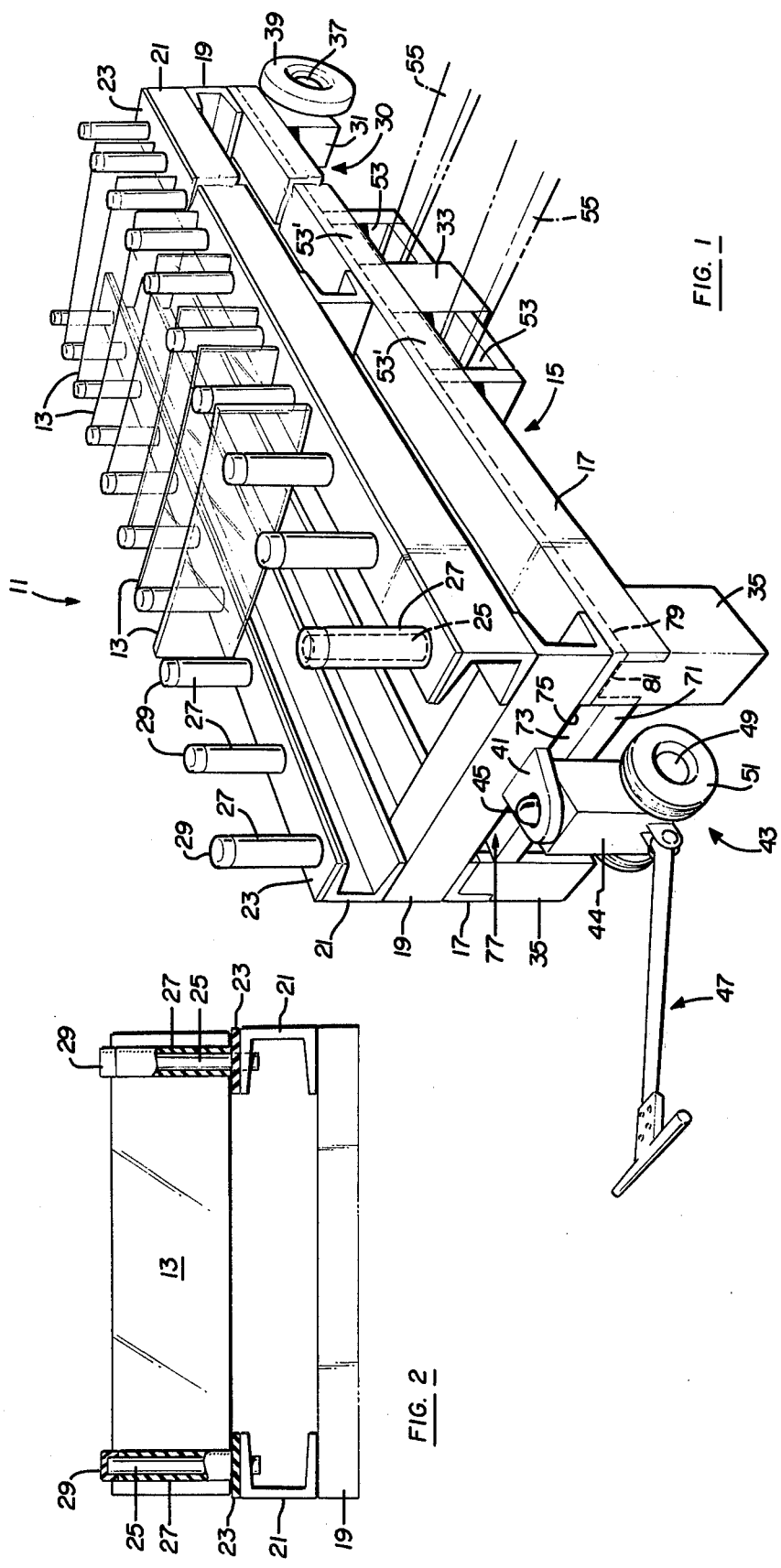

APPARATUS FOR CARRYING GLASS PANELS

BACKGROUND OF THE INVENTION

1. Field of the Invention

This invention relates generally to an apparatus for carrying glass panels, and more particularly, to an improved apparatus for carrying panels such as the curved glass windshields used in automobiles and the like without breaking, scratching or chipping the windshield during transport.

2. Description of the Prior Art.

Many types of glass panels and, in particular, the windshields of present day automobiles vary considerably in size, shape, and curvature. Current apparatus for storing and transporting such glass panels generally employ adjustable clamping means which can be varied to clamp windshields of different sizes, shapes and curvatures therebetween.

Many of the containers of the prior art are adapted to be carried by hand and hence are capable of handling only a small number of panels at a time. Other types of storage and shipping containers or apparatus frequently result in chipped or cracked edges on the lower edge of the panel resulting from contact with the top surfaces of the clamping mechanisms or from contact with the surfaces upon which the edge of the windshield rests during or after clamping. Any type of chip or scratch on the surface of the windshield renders it unuseable for its intended purpose and adds to the cost of the windshield and its shipping costs.

There is a continued need for a windshield carrier which is capable of handling many different sizes, shapes and curvatures of windshield and which simultaneously eliminates or at least minimizes the possibility of scratching, chipping or breaking the glass.

The present invention provides an improved windshield carrier which is capable of supportively transporting a large number of windshields of various sizes, shapes and curvatures without breaking, scratching or chipping any portion of the transported windshields. Additionally, the present invention provides means for transporting the carrier whereby it may be moved in either a longitudinal direction or a lateral direction so that the windshield may be loaded and unloaded from either side or either end thereof.

SUMMARY OF THE INVENTION

The present invention relates to an improved apparatus for transporting glass panels such as the curved windshields used in automobiles and the like without scratching, breaking or chipping any portion of the windshield. A generally rectangular body frame is provided and the two elongated sides of the frame are at least partially covered with a relatively firm resilient material. Each of the elongated sides contains a spaced row of substantially upright support members. Each of the support members has a tubular sleeve fitted thereover. The tubular sleeve is preferrably made from a second relatively more resilient material such as sponge rubber or the like. Furthermore, the upper end of each of the members is provided with a rubber cap to prevent chipping or scratching of the windshield as is inserted into the space between adjacent upright members. The spacing between adjacent upright members is sufficient to supportively receive a windshield having the greatest curvature expected to be encountered and the distance between the parallel elongated sides of the frame is sufficient to operatively support the shortest length of windshield expected to be encountered. At least a portion of the lower edge of the windshield rests on the first relatively firm resilient layer or base and a portion of its side rests against one of the sleeves to prevent breaking, scratching and slipping of the sleeves to prevent breaking, scratching and slipping of the windshield. A sponge rubber padding may be inserted between the opposite side of the supported windshield and the adjacent sleeved upright member to further secure and protect the windshield during transport.

The frame includes a set of openings on at least one side for receiving the tines of a forklift for positioning the carrier along a first axis and, a similar apparatus or, in the alternative, wheeled means are provided at the ends thereof for positioning the carrier in a direction transverse to first axis so that the carrier can be positioned for loading and unloading from either of the sides or from either of the ends of the carrier.

Since the lower edge of the windshield supportively rests upon the first relatively firm resilient layer, that portion of the windshield is protected against breakage or scratching. Additionally, the first relatively firm resilient layer insures that the windshield does not slide forward, backward, or sideways during transport of the windshields.

The relatively resilient sleeve members insure that at least a portion of one side of the windshield which rests against the sleeve is protected from scratching, clipping or breaking. The end rubber cap insures that the edges or surfaces of the windshield will not be scratched, chipped or broken during the loading and unloading operations. Additionally, the windshields may be temporarily balanced or positioned on the caps during the loading and unloading operations. Additional individual pieces or pads of foam rubber may be inserted between the surface of the windshield not contacting the sleeved member and the adjacent sleeved member to securely hold the windshield against movement during transportation and to further protect the same.

The carrier may be positioned in either direction along a first axis or in either direction along an axis transverse thereto so that it may be loaded and unloaded from either of the sides or either of the ends thereof. Vertical legs are provided on the corners of the frame and a pair of wheels are provided on one pair of the legs. The opposite end is equipped with a hitching means or eye and a wheeled dolly may be positioned to operatively engage the eye, lift the front end of the frame, and transport the carrier in either direction along the first axis by means of the wheels. Additionally, openings may be provided on each of the sides of the carrier or may be substituted for the wheel-dolly arrangement. The openings are adapted to be engaged by the tines of a forklift which is able to lift the carrier and position it in either direction along a direction normal to the first axis for ease of loading and unloading.

The windshield carrier of the present invention is able to safely transport different sizes, shapes and curvatures of windshields from place to place without breaking, scratching or chipping the windshields. A large number of windshields may be transported safely and economically and the carrier may be positioned in any direction to allow it to be loaded and unloaded from any direction.

BRIEF DESCRIPTION OF THE DRAWINGS

These and other objects and advantages of the present invention will become more readily apparent upon reading the following specification which describes an illustrative embodiment of the present invention, along with the accompanying claims and the drawings in which:

FIG. 1 is a perspective view, partially broken away, of the windshield carrier of the present invention;

FIG. 2 is an end view, partially in section, of a portion of the apparatus of FIG. 1;

DESCRIPTION OF THE PREFERRED EMBODIMENT

Figure 3:
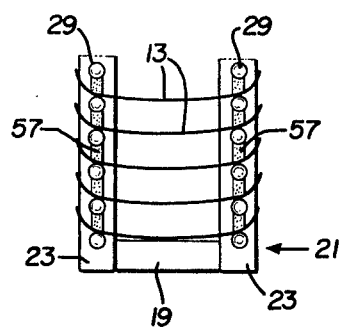
FIG. 3 is a partial top view of a portion of the apparatus of FIG. 1.

FIG. 1 shows the windshield carrier of the present invention represented generally by the reference character 11. The carrier 11 supportively transports a plurality of glass panels or windshields 13 from one place to another. A body or frame 15 includes a pair of parallelly spaced lower elongated side or frame members 17 supportively mounting a pair of transversely oriented parallel end members 19. Supportively mounted on the end members 19 are a second pair of elongated side frame elements 21 positioned immediately above and parallel to the lower elongated frame members 17. The upper elongated side elements 21 are covered or at least partially covered with a pad or layer 23 of relatively firm resilient material such as medium hard rubber. The layer pad or base 23 is used to support at least a portion of the lower edge of the windshields 13 to prevent the breaking, scratching or chipping of the windshield and to prevent the lower edge from slipping longitudinally or laterally during the transporting of the windshields 13.

Each of the upper elongated side elements 21 has rigidly mounted to the top surface thereof a row of spaced, substantially upright dowels or cylindrical support members 25. Each of these upright supports 25 is provided with an outer coating or tubular sleeve of a second relatively more resilient material such as Armaflex sponge rubber or the like. At least a portion of one side of opposite ends of the windshield 13 rest against the sponge rubber sleeve 27 so as to prevent breaking, chipping or scratching of the surfaces of the windshield 13.

Each of the cylindrical support members 25 is provided with an end cap on its upper distal end. The end cap may be made from medium hard rubber or the like and it serves to protect the edges and surfaces of the windshield 13 during the loading and unloading operation. Additionally, the windshield 13 may be temporarily rested upon the end cap 29 during the loading and unloading operations.

It will be noted that the lateral distance between the two side elements 21 is sufficient to supportively retain the shortest length of windshield 13 expected to encountered in the operation. In the preferred embodiment described herein, the width of the apparatus, as measured between the outside ends of the end elements 19 was 30 inches while the length measured as the length of the elongated upper side elements 21 was approximately 72 inches. Since the apparatus of FIG. 1 is shown broken at 30, it will be observed that any practical number of windshields may be transported on a given apparatus 11. It will also be noted that the spacing of the upright dowels 25 is such that the distance between adjacent members 25 is sufficient to supportively receive the greatest curvature of windshield expected to be encountered in the operation. In the preferred embodiment, the upright dowels 25 were made from 1 inch diameter round steel tubing with a 1/16 inch wall. The spacing of adjacent upright member 25 is 3 inches appart leaving approximately a 1 inch space to supportively receive the windshield 13 between adjacent dowels 25 since the tubular sleeving is approximately ½ inch wall thickness with an inside diameter of ⅞ of an inch so as to insure that it is securely fitted to the 1 inch diameter dowels. Similarly, in the preferred embodiment, the end cap 29 may be the type of medium hard rubber caps frequently used on chairs and step stools and the like and the first medium hard rubber layer 23 is approximately ½ inch thick and ½ inches wide. Since the windshields 13 are generally curved as shown in FIG. 3, the ends of the windshield where the curve is greater are supportively retained upon the layer 23 and prevented from sliding either laterally or longitudinally during the transport operation.

The windshield carrier 11 of FIG. 1 is provided with a plurality of positioning means which enables the carrier 11 to be positioned either longitudinally or laterally so that the windshield 13 may be loaded or unloaded from either of the sides and either of the ends of the carrier 11.

A first pair of rear support legs 31 extend downwardly from the rear end of the lower elongated side frame 17. A middle pair of support legs 33 extend vertically downward from a center portion of the side frame 17 and a front pair of support legs 35 extend vertically downward from the front end of the lower elongated side frame 17. A pair of rear wheels 37 are rotatively mounted on the sides of the rear support legs 31 and a pair of solid rubber tires 39 are mounted on the wheels 37. A tonge-like hitching means or eye 41 extends forward from the front end piece 19 and is substantially parallel to the ground. A dolly or lift jack 43 is provided at the front end to longitudinally position the carrier 11 in either the forward or the reverse direction along the longitudinal axis of the frame 15. The dolly 43 includes a body portion 44 having a handle 47 and a pair of wheels 49 rotatively secured thereto. Each of the wheels 49 has a solid rubber tire 51 and the upper end of the body portion 44 includes an eye-engaging pin 45 adapted to be received within the eye 41. Since the vertically upright front legs normally rest upon the ground, the insertion of the pin 45 within the eye 41 will cause a lifting of the front end of the carrier 11 and hence of the front legs 35 from the ground either as the dolly 43 is moved forward, or by a jacking motion of the handle 47 to raise the body portion 44 in the manner of a lifting jack, known in the art. Once the pin 45 has engaged the hitching means 41 and caused the front end of the carrier 11 to be raised, an operator can pull or push the handle 47, either manually or by means of a truck or tractor-type vehicle to longitudinally position the carrier 11 either forward or backward.

Alternatively, the frame 11 may be provided with tine-receiving passages or openings 53 at either of the ends or either of the sides thereof. In the embodiment of FIG. 1, a pair of passages 53 are provided on either side of the center leg 33 and these passages 53 are adapted to receivably engage the tines 55, shown in phantom lines in FIG. 1, of a fork lift (not shown but known in the art) which can lift the carrier 11 to position it laterally in either direction along an axis normal to the longitudinal axis of the frame 15 so that the windshileds 13 may be loaded and unloaded from either side and from either end of the carrier 11.

Figure 4:
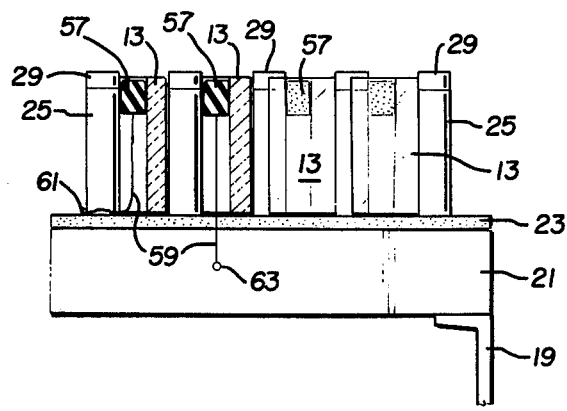
FIG. 4 is a partial side view of a portion of the apparatus of FIG. 1 illustrating the use of the foam rubber pads.

If it is desired that the windshields 13 be even further secured against slipping, twisting and turning, and even further protected against breaking, chipping and scratching during the transporting operation, a plurality of individual sponge rubber elements or pads 57 may be inserted as shown in FIG. 4. The sponge rubber pads 57 may be manually inserted between the upper ends of the sleeved dowels 25 and a portion of the surface of the windshield to prevent a tilting of the windshields between adjacent dowels 25 and to insure that at least a portion of one surface of the windshield 13 rest against the entire length of the upright sleeve 27. The sponge rubber pads 57 may be entirely free or they may be attached by tethered means 59 to the sleeved dowels 25 as by a loop 61 or to some portion of the frame 15 by some fastening means known in the art.

Several alternate embodiments of the structure of the carrier 11 are briefly described hereinbelow. If the tines or prongs 55 of a forklift, not shown, are to be used to longitudinally position the carrier 11 instead of the wheel and dolly arrangement, then a pair of tine-receiving passages or openings similar to those illustrated at 53 on the side of the carrier 11 may be provided at one or both ends of the carrier. Alternatively, an elongated lateral member 71 may be rigidly fastened between the front legs 35. There will be an opening or tine-receiving space between the top surface 73 of the lateral end member 71 and the bottom surface 75 of the C-shaped end piece 19. The tines 55 may be guidably received within this opening 77 to lift the carrier 11 without tipping or the like. Even further, a vertical post, not shown could be rigidly depended from the center of the lower surface 75 to the top surface 73 to divide the opening 77 into two distinct passages as the middle leg 33 forms the two passages 53. it will, of course, be understood that an identical tine-receiving assembly would normally be located at the opposite longitudinal end such that the primary method of longitudinal or lateral positioning for loading or unloading would be via the forklift whereas the wheel-dolly arrangement could be used as an alternate means for longitudinally positioning but would be primarily used for transporting the carrier 11 from place to place within the factory, warehouse, or the like.

The carriers would normally be transported from the windshield manufacturing site to the utilization site on a flat bed truck or the like. Four or more carriers would be loaded on a single truck and the dollys 43 would not be transported. One dolly 43 located at each site could, of course, serve to transport any number of carriers 11 at a given site. Ideally, each time a full carrier or carriers is delivered, an equal number of empty carriers is returned to the windshield manufacturing site via the truck.

Additionally, the elongated side members 17 which are shown to have an L-shaped cross-section in the preferred embodiment of FIG. 1, may be rotated ninety degrees as shown by the phantom lines 79 so as to allow the openings 53 to be positioned higher as at 53' and so as to present the substantially flat underside 81 of the member 17 for greater contact with the tines 55 of the forklift. Lastly, it will, of course, be understood that any suitable materials may be used as known in the art. The upright dowels 25, for example, may be made of wood such as birch, or some suitable plastic or the like.

In operation, the individual windshields 13 are inserted between adjacent pairs of upright dowels 25 each of which is covered with a sponge rubber tubular sleeve 27. The bottom edge of the windshield 13 rests on the first layer of relatively firm resilient materials 23 and is prevented from slipping or sliding thereby. A portion of the side of the windshield restably leans against at least a portion of the sleeve 27 and is protected from breaking, chipping or scratching thereby. The rubber end caps 29 insure that the windshield 13 will not be damaged during the loading or unloading operations. Foam rubber inserts 57 may be inserted between the opposite sides of the windshields and the adjacent sleeved dowels 25 to positively insure that the windshields 13 are not damaged by scratching, breaking or chipping during the transporting operation. Additionally, either the wheeled arrangement or the forklift attachment or both may be used to insure that the carrier can be positioned either longitudinally or laterally so that it can be loaded and unloaded either from the sides or from the ends thereof.

While specific apparatus, materials and dimensions have been recited in describing the prime embodiment of the present invention, it will be obvious to those skilled in the art that various modifications can be made without departing from the spirit and scope of the present invention which is limited only by the appended claims.

I claim:
1. An apparatus for carrying, holding and storing glass windshields so that such windshields may be transported without damage thereto comprising:
  a frame having first and second longitudinal frame members of generally the same length, said frame members being arranged parallel and in laterally spaced apart relation, said frame members having upper surfaces which are flat, with said upper surfaces of said frame members laying in a horizontal plane;
  elongated pads of resilient material secured to the upper surfaces of said first and second longitudinal frame members, each pad extending the entire length of the corresponding frame member, being adapted to support first portion of a glass windshield placed thereon and prevent slippage of the windshield in either a longitudinal direction or in a lateral direction;
  a first row of upright stationary dowels of generally cylindrical configuration fixedly secured to and positioned at predetermined spaced locations along the length of said first longitudinal frame member;
  a second row of upright stationary dowels of generally cylindrical configuration fixedly secured to and positioned at corresponding predetermined spaced locations along the length of said second longitudinal frame member;
  said dowels extending from said frame members through openings provided in said pads;
  the spacing between said dowels of said first and second rows being at least sufficient to supportively receive the largest of said windshields likely to be encountered;

each of said dowels of said first and second rows being provided with a stationary elongated tubular resilient member of generally cylindrical configuration which is sleeved over the dowel, each tubular member having upper and lower annular surfaces, with the lower annular surface of each tubular member abutting one of the pads of resilient material, each of the elongated tubular resilient members being adapted to support a second portion of the windshield and prevent the scratching or breaking thereof, each tubular resilient member having a length less than the length of the corresponding dowel;

a stationary end cap of resilient material for each dowel sleeved over the upper portion thereof and having upper and lower surfaces, the lower surface of each end cap abutting the upper annular surface of the corresponding tubular resilient member, the upper surface of each resilient end cap lying in a horizontally extending plane to prevent breaking or scratching of the windshields during loading and unloading operations;

said elongated tubular resilient member and the corresponding resilient end cap for each dowel completely enclosing and covering same; and means associated with said frame for enabling the apparatus to be transported from place to place.

2. The apparatus of claim 1 further characterized in that each of said tubular resilient members is relatively more resilient than the corresponding pad.

3. The apparatus of claim 1 further characterized in that said transport-enabling means includes means secured to the underside of said frame and adapted to receive the fork elements of a lift truck for lifting and transporting said apparatus.

4. The apparatus of claim 1 further characterized in that said frame is generally rectangular and said transport enabling means includes a pair of wheels mounted at one end of said frame, a hitch means mounted at the opposite end thereof, andd a wheeled dolly adapted to engage said hitch means for transporting said apparatus.

5. The apparatus of claim 4 further characterized in that the end of said frame mounting said hitch means further includes a pair of legs adapted to support said assembly whenever said dolly is disengaged from said hitch means.

6. The apparatus of claim 5 further including individual pads of sponge-like rubber adapted to be inserted between the upper portion of the windshield and an upper portion of an adjacent dowel for preventing relative movement between the windshield and said apparatus.

7. The apparatus of claim 1 further characterized in that that said transport-enabling means includes means mounted on at least one longitudinal end thereof to permit longitudinal positioning of the apparatus and means mounted on at least one longitudinal side of the frame for permitting the apparatus to be positioned laterally such that the apparatus can be easily positioned for loading and unloading from either end or side.

* * * * *